United States Patent
Seroussi (10) Patent No.: US 7,580,814 B1
(45) Date of Patent: Aug. 25, 2009

(54) SEQUENCE SIMULATOR

(75) Inventor: Gadiel Seroussi, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 10/807,701

(22) Filed: Mar. 23, 2004

(51) Int. Cl.
G06F 7/60 (2006.01)
G06F 17/10 (2006.01)

(52) U.S. Cl. .......................................... 703/2

(58) Field of Classification Search ........................ 703/2
See application file for complete search history.

(56) References Cited

U.S. PATENT DOCUMENTS 6,674,908 B1 * 1/2004 Aronov ........................ 382/232

OTHER PUBLICATIONS

Savari "Renewal Theory and Source Coding" IEEE 2000.*
Sakarya et al. "An Evaluation of SAR Image Compression Techniques," IEEE 1997.*
El-Maleh et al. "A Geometric Primitives Based Compression Scheme for Testing Systems on a Chip" IEEE 2001.*
Akl, Selim G., "A Comparison of Combination Generation Methods" ACM Transactions on Mathematical Software, vol. 7, No. 1, pp. 42-45 (Mar. 1981).
Payne, W. H. and Ives, F.M., "Combination Generators" ACM Transactions on Mathematical Software, vol. 5, No. 2, pp. 163-172 (Jun. 1979).
Ziv, Jacob and Lempel, Abraham, "Compression of Individual Sequences via Variable-Rate Coding" IEEE Transactions on Information Theory, vol. IT-24, No. 5, pp. 530-536 (Sep. 1978).

* cited by examiner

Primary Examiner—Kamini Shah
Assistant Examiner—Saif Alhija (57) ABSTRACT

A process for simulating an input sequence partitions the input sequence into a set of substrings and a tail. The substrings preferably have lengths that are not all equal. An output sequence then includes the substrings in a random order.

16 Claims, 5 Drawing Sheets

SEQUENCE SIMULATOR

BACKGROUND

Data sequences that arise from measurements are often random in that there are no known functions for generating the sequences. However, such sequences typically have measurable statistical characteristics such as a frequency or number of repetitions of a particular substring or subsequence. A conventional random number generator that generates random numbers that are uniformly distributed over a target range generally fails to provide a sequence that reproduces the statistical characteristics of the original sequence. Still, the ability to generate a simulated sequence having the same statistical characteristics as an original sequence is often desirable.

One situation where simulated sequences are particularly useful arises when data of a specific kind is necessary for computations, but not enough of the data is available. For example, measurements on a communication channel can generate a data sequence representing error events in the communications channel, and the measured data sequence can be used to test an error correction system designed for the channel. However, full testing of the error correction system may require more error data than is available from the actual measurements. A simulated data sequence can then be used to complete the system evaluation. Simulated data sequences may also be useful or required in testing of predictive systems such as financial forecasting models or weather forecasting models or in testing of data processing systems such as compression software, particularly when testing is for very long periods of time (e.g., weeks of CPU time). In these applications, the simulated data should have the same characteristics as the actual data in order to provide accurate tests.

Computer graphics is another area where simulated sequences are useful. In particular, computer graphics often use textures that add color variations to objects in generated images and therefore make the objects appear more realistic. Such textures can be created using samples from images of real objects and are random but with specific visual characteristics.

Figure 1A:
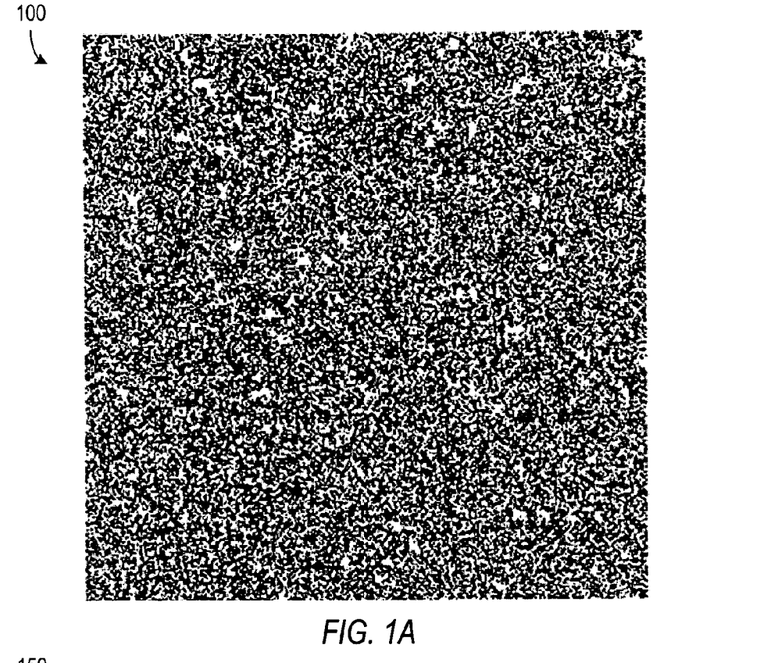
FIGS. 1A and 1B respectively show an original binary texture and a simulated binary texture in accordance with an embodiment of the invention.

FIG. 1A illustrates an example of a binary texture 100, which corresponds to an array of pixels that have either a first color or a second color (e.g., black or white) depending on a corresponding binary value 0 or 1 for the pixel. An ordering rule for the pixel values corresponding to binary texture 100 (e.g., ordering the pixel values in typewriter or zigzag fashion across the entire array of pixel values) can rearrange the array of pixel values corresponding to texture 100 into a one-dimensional sequence. In a generated image, binary texture 100 can cover a region that fits within the boundaries of array of pixel values, or multiple copies of texture 100 can be fit together like tiles to cover a larger region. However, tiling processes may be undesirable when the visual characteristics at the boundaries of the tiles visibly differ from the other portions of texture 100 or when repeated tiles create a visually noticeable repetition in an otherwise random pattern. It is desirable to be able to create a random texture of arbitrary size that maintains the visible characteristics of the original texture 100. A simulated sequence having the same statistical properties as the sequence derived from the original texture 100 would ideally produce a simulated texture that is visibly similar to the original texture 100.

SUMMARY

In accordance with an aspect of the invention, a process for simulating an input sequence partitions the input sequence into a partition including a set of substrings and a tail. The substrings preferably have lengths that are not all equal. An output sequence can include the substrings in a random order.

BRIEF DESCRIPTION OF THE DRAWINGS

Use of the same reference symbols in different figures indicates similar or identical items.

DETAILED DESCRIPTION

In accordance with an aspect of the invention, a simulation process parses an input sequence into a set of substrings of varying lengths and rearranges or permutes the substrings to produce a simulation of the input sequence. The simulation resembles the input sequence in a statistical sense but has a random ordering of the substrings.

A sequence X of length N generally includes an ordered set of symbols $x_i$ for i from 1 to N, where each symbol $x_i$ is an element of an alphabet A. For example, a binary sequence of length N corresponds to an N-bit number, and the alphabet A for a binary sequence is a set containing symbols corresponding to binary values 0 and 1 (i.e., A={0,1} for a binary sequence). Equation 1 more generally represents a sequence X made of N symbols $x_i$ to $x_N$.

$$X = x_1 x_2 \ldots x_N \qquad \text{Equation 1}$$

The sequence X of symbols $x_i$ can be parsed into a sequence of substrings $p_j$ for j from 1 to C with a tail q as indicated in Equation 2. Substrings $p_j$ preferably have a variety of different lengths and may be distinct so that no two of the substrings are identical. With the restriction that the substrings be distinct, tail q can be the empty string (i.e., a string of length zero) or equal to one of the substrings $p_j$. The number C of substrings $p_j$ in the partition of sequence X is less than or equal to the number N of symbols $x_i$ in sequence X since each substring $p_j$ contains at least one symbol. An empty substring $p_0$ can be added to the partition as shown in Equation 2 to simplify certain recursive relations described below.

$$X = p_1 p_2 \ldots p_C q = p_0 p_1 p_2 \ldots p_C q \qquad \text{Equation 2}$$

Sequence X can generally be parsed in many different ways, resulting in different sets of substrings $p_i$ to $p_C$. The Lempel-Ziv incremental parsing rule, which is described further by J. Ziv and A. Lempel, "Compression of Individual Sequences via Variable-Rate Coding," IEEE Trans. Inform. Theory, vol. IT-24, pp. 530-536, provides one method for partitioning a sequence X into distinct substrings $p_j$. The Lempel-Ziv incremental parsing rule begins at the start (e.g., symbol $x_1$) of a sequence X and selects a first substring $p_1$ to contain only the first symbol $x_1$. Each substring $p_j$ is then selected to be the shortest substring of symbols that immediately follows the previous substring $p_{j-1}$ and is not equal to any preceding substring $p_i$ for i less than j. The partition resulting from the Lempel-Ziv incremental parsing rule is a set of distinct substrings and is sure to provide substrings of different lengths if the number of symbols in the sequence X is greater by at least two symbols than the number of symbols in the alphabet A.

A universal LZ-type of a sequence X can be defined to include all sequences Y for which applying the LZ incremental parsing rule results in the same set of substrings $p_j$. (More generally, other parsing rules similarly define a type for a sequence X as the set of all sequences Y for which the parsing rule generates the same set of distinct substrings.) The set of all sequences that are of the same type as sequence X is denoted herein as type $T_X$. A sequence Y that is of type $T_X$ but not equal to sequence X will generally have substrings $p_j$ in a different order from that found in sequence X or will have a different tail q.

Two sequences X and Y of the same type generally have similar or identical empirical statistics. In particular, the k-th order empirical distribution of a sequence X can be characterized by a vector $P_X$ having real valued components $P_X(u)$. Strings u that are of length k (i.e., $u \in A^k$) index the components $P_X(u)$ of vector $P_X$, and each component $P_X(u)$ is equal to the relative frequency of occurrences of string u in sequence X (i.e., the count of occurrences of u in X, divided by the number of possible locations in X where u could occur, namely, N−k+1 locations). Equation 3 provides a mathematical representation of components $P_X(u)$. It can be shown that in the limit as the length N of sequences X and Y of the same type becomes large, the difference between the corresponding vectors $P_X$ and $P_Y$ goes to zero as indicated in Equation 4. Accordingly, two sequences X and Y in the same class have similar empirical statistics of any order k at least when N is sufficiently large.

$$P_X(u) = \frac{|\{i : 1 \le i \le N - k - 1 \text{ and } x_i x_{i+1} \ldots x_{i+k-1} = u\}|}{(N - k + 1)} \quad \text{Equation 3}$$

$$\lim_{N \to \infty} |P_X(u) - P_Y(u)| \to 0 \text{ for all } u \in A^k \quad \text{Equation 4}$$

Figure 1B:
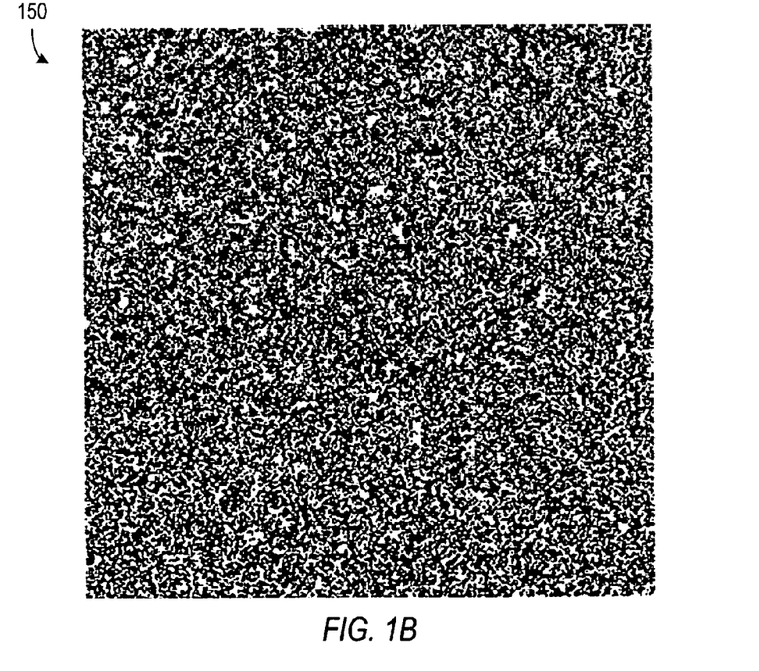

In accordance with an aspect of the invention, a sequence Y randomly and uniformly drawn from the type $T_X$ of an input sequence X provides a simulation of sequence X. From Equation 4, the simulation Y has characteristics matching a sequence X. In some graphics applications, such simulation Y can be experimentally shown to correspond to a texture that is visually similar to a texture corresponding to sequence X. FIG. 1B, for example, shows a texture 150 corresponding to a simulated sequence Y that is of the same type $T_X$ as the sequence X corresponding to original texture 100 of FIG. 1A.

To avoid the undesirable effects of repeating the original sequence, preferred simulation schemes should produce a large set of candidate simulations of sequence X with all of the candidate simulations satisfying the constraints of Equation 4. The constraint of Equation 4 ensures that each candidate simulation is "similar" to X, while the large set of candidate simulations makes the selected simulation Y as random or uncertain as possible. The uncertainty or randomness of a simulation Y is often measured in terms of entropy H(Y). The entropy H(Y) of a random sequence Y chosen with uniform probability from a set S is $\log_2 |S|$, where $\log_2$ denotes the base-2 logarithm, and $|S|$ is the cardinality of set S. For the universal type class $T_X$ defined above, it can be shown, in a well defined mathematical sense, that the ratio $\log_2 |T_X| / \log_2 |S|$ approaches unity as the number N of symbols grows to infinity, where S is the set of all sequences satisfying Equation 4 and $T_X$ is the set of all sequences of the same universal LZ-type as sequence X. Accordingly, since the cardinality of universal LZ-type $T_X$ approaches the cardinality of the set S of all sequences satisfying Equation 4, randomly selecting a simulation Y from the LZ-type of a sequence X provides (or approaches) maximal entropy H(Y) for a simulation Y that is similar to sequence X.

Figure 2:
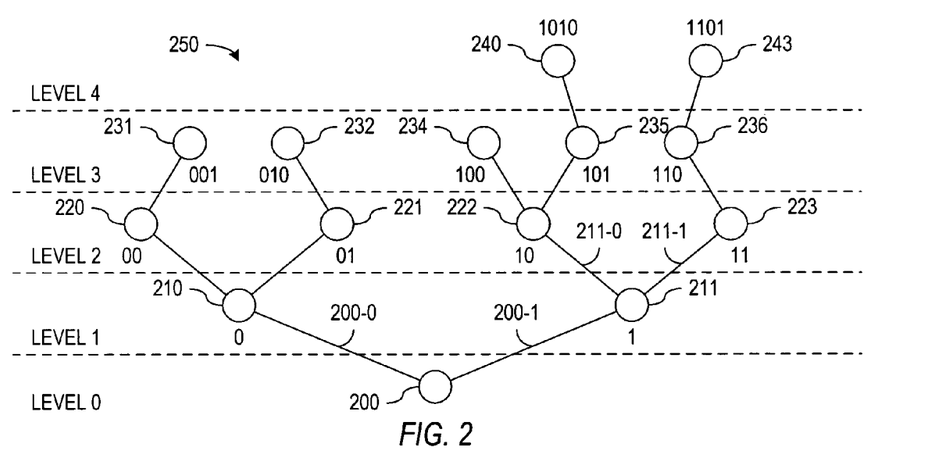
FIG. 2 shows a tree structure corresponding to a universal LZ-type of a binary sequence.

One technique for randomly selecting a simulation of the same type as a sequence X uses a tree structure that represents the type (e.g., the universal LZ-type $T_X$) of the sequence X. For illustrative purposes, FIG. 2 shows a tree structure 250 representing the universal LZ-type of a binary sequence X0 of Equation 5. Commas in Equation 5 separate the substrings of sequence X0 that result from the LZ incremental parsing rule.

$$X0=1,0,01,10,101,11,110,1010,00,100,010,1101,001 \quad \text{Equation 5}$$

Tree structure 250 includes five levels 0 to 4 of nodes. Nodes populating each level of the tree structure correspond to distinct substrings of sequence X0 that have a length corresponding to the level. In particular, level 0 contains a root node 200 corresponding to the empty substring $p_0$. Level 1 contains two nodes 210 and 211 respectively corresponding to 1-bit substrings 0 and 1. Level 2 contains four nodes 220, 221, 222, and 223 respectively corresponding to 2-bit substrings 00, 01, 10, and 11. Level 3 contains five nodes 231, 232, 234, 235, and 236 respectively corresponding to substrings 001, 010, 100, 101, and 110, and level 4 contains two nodes 240 and 243 respectively corresponding to 4-bit substrings 1010 and 1101. The LZ incremental partitioning rule is such that for each non-empty substring in the partition, removal of the last symbol from the non-empty substring forms a shorter substring (possibly the empty string) that is also in the partition. Branches such as branches 210-0 and 210-1 illustrate the relation of each non-empty node to a node in a lower level of tree structure 250.

Tree structure 250 of FIG. 2 can be generalized for representations of the types for other sequences. For example, more levels can be added for longer sequences or sequences that otherwise require longer substrings. In a general case, the n-th level contains nodes corresponding to n-symbol substrings, and the maximum number of branches leading up from any node is equal to the number of symbols in the alphabet A. For a binary sequence, each node has 0, 1, or 2 upward branches as illustrated in FIG. 2, but in a sequence having M symbols in alphabet A, each node has between 0 and M upward branches.

Figure 3:
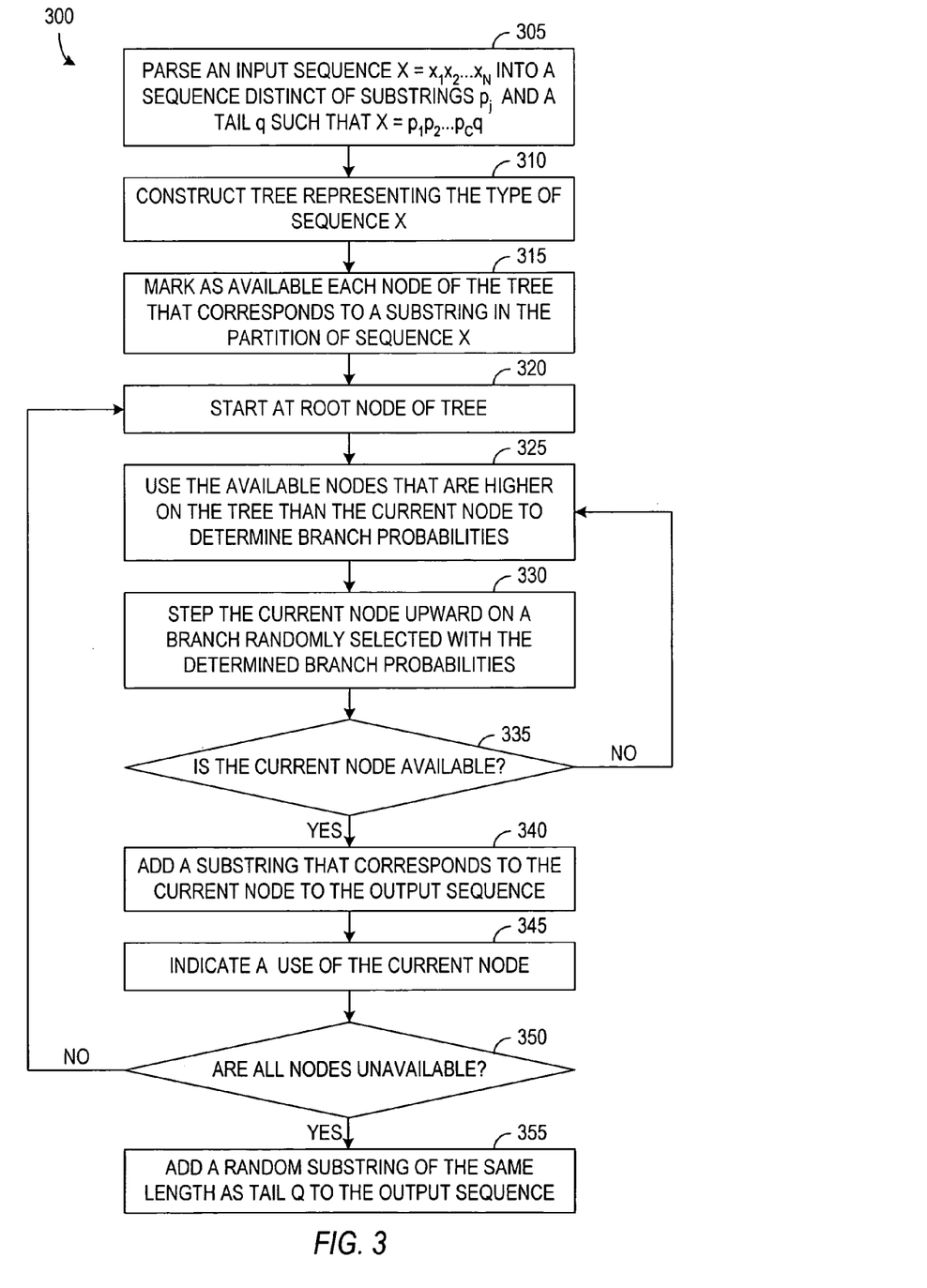
FIG. 3 is a flow diagram of a process in accordance with an embodiment of the invention that simulates a sequence using a walking-the-tree technique.

In accordance with an aspect of the invention, a simulator can use a tree structure representing the type of an input sequence X to generate a simulation Y of the same type. FIG. 3 is a flow diagram of one such simulation process 300. Simulation process 300 is preferably implemented as a program executed in a processing system such as a computer and can be embodied as a set of instructions stored in or on an electronic memory, a storage disk (e.g., a floppy disk, a CD, or a DVD), or any other storage medium. Alternatively, a simulator that performs the process 300 of FIG. 3 can be implemented in hardware, for example, as an electronic circuit or other device capable of executing the steps described below.

Simulation process 300 begins in step 305 with partitioning of an input sequence X into distinct substrings $p_j$ and a tail q. In an exemplary embodiment of the invention, the LZ incremental partitioning rule can partition the sequence X as described above, but more generally any partitioning process that provides substrings $p_j$ of increasing lengths can be used. For example, a fixed partitioning rule that is independent of the content of the input sequence can divide the input sequence into a series of substrings of different lengths, e.g., M substrings of length 1, $M^2$ substrings of length 2, up to $M^k$ substrings of length k, where M is the number of symbols in the alphabet used in sequence X.

Step 310 then constructs a tree structure that contains multiple levels with each level l containing nodes corresponding to l-symbol substrings in the partition of sequence X. For an LZ incremental partitioning, branches in the tree structure connect nodes corresponding to non-empty substrings in the partition of sequence X to lower level nodes corresponding to shorter substrings in the partition of sequence X. For each node that corresponds to a substring in the partition of sequence X, step 315 marks the node as available (e.g., by setting a program flag for the node). For a partition where the substrings are not distinct from each other, step 315 can mark nodes corresponding to repeated substrings with a number of repetitions of the substring.

Steps 320 to 355 use the tree structure for sequence X to construct a simulation Y that is of the same type as sequence X. In particular, step 320 picks the root node of the tree structure as a current node for a walking-the-tree process. The root node corresponds to an empty substring $p_0$, and branches of the tree structure connect root node to nodes in the first level of the tree. For each branch leading up from the current node, step 325 calculates a probability for taking that branch a step up to the next level of the tree. For each branch, the probability is equal to the ratio of the number of available uses of nodes on that branch to the total number of available uses of nodes on all branches leading up from the current node.

Tree structure 250 of FIG. 2 provides an illustrative example for application of process 300 of FIG. 3 to a binary sequence partitioned into distinct substrings. In that example, when the current node is the root node 200 in tree structure 250, step 325 calculates a probability for branch 200-0 and another probability for branch 200-1. Initially, all 13 nodes 210 to 243 are available for one use. Five nodes 210, 220, 221, 231, and 232 are available on branch 200-0, and eight nodes 211, 222, 223, 234, 235, 236, 240, and 243 are available on branch 200-1. The first execution of step 325 thus determines a probability of 5/13 for branch 200-0 and a probability of 8/13 for branch 200-1.

Step 330 randomly takes one of the available branches and steps the current node upward to the next level of the tree structure. The probabilities from step 325 indicate the chances of the random step taking the respective branches. For the example of the tree structure of FIG. 2, the first execution of step 330 has a 5-out-of-13 chance of taking branch 200-0, which would makes node 210 the current node, and an 8-out-of-13 chance of taking branch 200-1, which would makes node 211 the current node.

Decision step 335 determines whether the current node is available. If the current node is available, step 340 adds the substring for the current node to the simulation Y (e.g., concatenates the substring to one end of any previously generated portion of the simulation Y). In step 345, the available uses of the node corresponding to the added substring is then decreased, possibly making the node unavailable, and process 300 branches back to step 320 unless a decision step 350 determines that all nodes are unavailable. If decision step 335 determines that the current node is unavailable, process 300 branches from step 335 back to step 325. Step 325 then calculates new probabilities for a step up from the new current node.

For the example of tree structure 250 of FIG. 2, if a first execution of step 330 changes the current node from root node 200 to node 211, a 1-bit substring "1" becomes the first symbol of simulation Y, and node 211 is marked as unavailable in step 345. Process 300 branches from step 350 back to step 320, where the current node is again set to root node 200. Step 325 then determines the probability for stepping to node 210 to be 5/12 and the probability for stepping to node 211 to be 7/12 because five nodes 210, 220, 221, 231, and 232 are then available on branch 200-0 and seven nodes 222, 223, 234, 235, 236, 240, and 243 are then available on branch 200-1. If step 330 then randomly selects to step from root node 200 to node 211 again, decision step 335 causes process 300 to branch back to step 325 because node 211 is unavailable. Step 325 then determines the probability for stepping from then current node 211 to node 222 to be 4/7 and the probability for stepping to node 223 to be 3/7 because four nodes 223, 234, 235, and 240 are then available on branch 211-0 and three nodes 223, 236, and 243 are then available on branch 211-1. Step 340 would then add the 2-bit substring 10 or 11 to simulation Y depending on which branch 211-0 or 211-1 step 330 selected.

Decision step 350 will determine that all nodes are unavailable after a sufficient number of repetitions of steps 320 to 350. At that point, process 300 branches to step 355 and adds to simulation Y a tail that is randomly selected from the substrings of the partition of sequence X. If step 355 selects and adds a substring that is equal in length to the original tail q of sequence X, simulation Y will also have the same length as sequence X, and will be of the same type as sequence X.

Stopping process 300 when a desired length is achieved, instead of when all substrings are unavailable, can provide a shorter simulation Y, but the statistics of a simulation Y that is shorter than the original sequence X may differ from the statistics for sequence X in a manner that depends on the length of the simulation. Repeating process 300 can create a longer simulation Y. Another technique for increasing the length of the sequence assigns larger use numbers to the nodes that corresponds to the substrings in the partition of input sequence X. Each node could then remain available until step 345 marks the node as being used a predetermined number of times (e.g., doubling the available uses for each node provides a simulation Y that is twice as long as sequence X.)

Figure 4:
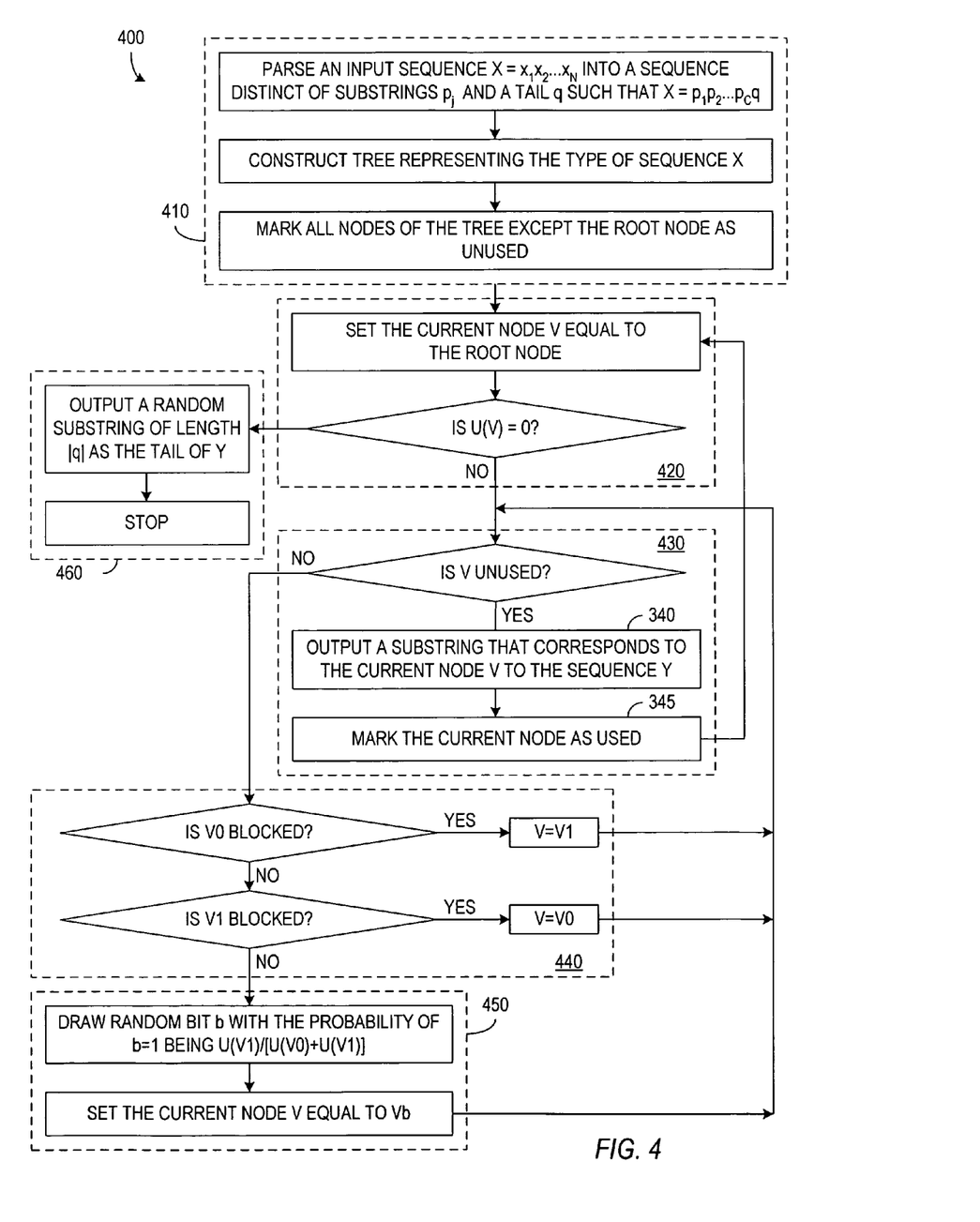
FIG. 4 is a flow diagram of a process in accordance with an embodiment of the invention that simulates an original binary sequence using a walking-the-tree technique with a tree representing the universal LZ-type of the original sequence.

FIG. 4 shows a process 400 in accordance with a specific embodiment of the invention that generates a simulation Y of an input binary sequence X using a tree structure associated with the universal LZ-type of sequence X. Process 400 begins in step 410 with the initial steps of parsing input sequence X using the LZ-parsing rule, constructing a tree structure having nodes corresponding to the substrings resulting from the parsing, and marking each node, except the root node as being unused.

Step 420 sets a current node V equal to the root node and checks for unused nodes in the tree. In FIG. 4, the function U(Vx) is defined to be equal to the number of unused nodes in a sub-tree having node Vx as root node. Accordingly, when the current node V is the root node of the entire tree and U(V) is equal to 0, process 400 branches from step 420 to step 460, which generates a tail for the simulation Y and then ends process 400. Otherwise, at least one node is unused (U(V)>0), and process 400 proceeds from step 420 to step 430.

Step 430 determines whether the current node V is unused. If current node V is unused, step 430 outputs the substring corresponding to the current node V as the next phrase of simulation Y, marks the current node V as used, and branches back to step 420. Otherwise, if the current node V is used, no substring is output, and process 400 branches from step 430 to step 440.

Step 440 checks whether the branches from the current node V to nodes V0 and V1 that correspond to substrings respectively found by concatenating symbols 0 and 1 to the substring associated with the current node V are blocked. A branch is blocked if there are no unused nodes on that branch. If the branch from current node V to node V0 is blocked, the current node V is set equal to node V1, and process 400 branches back to step 430. If the path from node V to node V1 is blocked, the current node V is set equal to node V0, and process 400 branches back to step 430. If neither branch is blocked, process 400 proceeds from step 440 to step 450.

Step 450 selects between the two unblocked branches and changes the current node V to the next node on the selected branch. To select a branch, step 450 draws a random bit b with a probability of being 1 equal to U(V1)/[U(V0)+U(V1)]. The current node V is then set equal to Vb, and process 400 branches back to step 430.

Figure 5:
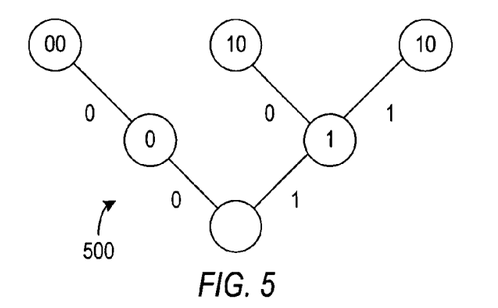
FIG. 5 shows a tree structure for an exemplary execution of the process of FIG. 4.

Table 1 shows an example of an execution of process 400 of FIG. 4 to generate a 8-bit simulation Y (00011011) of an 8-bit sequence X (10101100) having a tree structure 500 illustrated in FIG. 5.

TABLE 1

| Step | V | Status | U(V0),U(V1) | Choice | Prob. | Output |
|---|---|---|---|---|---|---|
| 420 | Root | | | | | |
| 430 | Root | Used | | | | |
| 440 | Root | | 2,3 | | | |
| 450 | Root | | 2,3 | 0 | 2/5 | |
| 430 | 0 | Unused | | | | 0 |
| 420-440 | Root | | 1,3 | | | |
| 450 | Root | | 1,3 | 0 | 1/4 | |
| 420 | 0 | Used | 1,0 | | | |
| 440 | 0 | | 1,0 | 0 | | |
| 430 | 00 | Unused | | | | 00 |
| 420-440 | Root | | 0,3 | 1 | | |
| 430 | 1 | Unused | | | | 1 |
| 420-440 | Root | | 0,2 | 1 | | |
| 430,440 | 1 | Used | 1,1 | | | |
| 450 | 1 | | 1,1 | 0 | 1.2 | |
| 430 | 10 | Unused | | | | 10 |
| 420-440 | Root | | | 1 | | |
| 430,440 | 1 | Used | | 1 | | |
| 430 | 11 | Unused | | | | 11 |
| 420 | Root | | 0,0 | | | |
| 460 | | | | | | |

Figure 6:
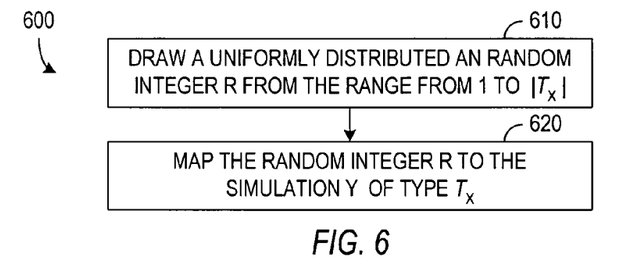
FIG. 6 is a flow diagram of a process in accordance with an embodiment of the invention that generates a simulated sequence by uniformly and randomly drawing a sequence from the set of sequences of the same type as an input sequence.

FIG. 6 illustrates a simulation process 600 in accordance with an alternative embodiment of the invention. Process 600 begins in step 610, which draws a uniformly distributed random integer $I_R$ from the range from 0 to $|T_X|-1$, where $|T_X|$ is the total number of sequences of the type $T_X$. The number $|T_X|$ of sequences of type $T_X$ generally varies exponentially with the number N of symbols in sequence X and for binary sequences can be calculated using the recursive formula of Equation 6. In Equation 6, $|T^0|$ and $|T^1|$ are the number of sequences in the types corresponding to sub-trees having root nodes that are one level up from the root node of tree $T_X$; $c_0$ and $c_1$ are the number of nodes respectively in sub-trees $T^0$ and $T^1$; $M(c_0,c_1)$ or $$\begin{pmatrix} c_0 + c_1 + 2 \\ c_0 + 1 \end{pmatrix}$$

is a known combinatorial function indicating the number of ways to interleave two ordered lists respectively containing $c_0+1$ and $c_1+1$ elements while preserving the orders of the lists; and m(|q|) denotes the number of nodes in tree Tx having the same number of symbols as tail q having length $n-n_r$. Step 520 maps the random integer $I_R$ to a corresponding sequence Y, which is of type $T_X$.

$$|T_X| = |T^0| \cdot |T^1| \cdot M(c_0,c_1) \cdot m(|q|) \qquad \text{Equation 6}$$

or $$|T_x| = |T^0| \cdot |T^1| \cdot \begin{pmatrix} c_0 + c_1 + 2 \\ c_0 + 1 \end{pmatrix} \cdot m(n - n_T),$$

A one-to-one mapping of an integer $I_R$ in the range from 0 to $|T_X|-1$ to the corresponding sequence of class $T_X$ corresponds to an enumeration of the sequences of type $T_X$. One enumeration procedure for a type $T_X$ of a binary sequence is based on the recursive relation of Equation 6 that relates the number $|T_X|$ of sequences of the type corresponding to a sequence X to the numbers $|T^0|$ and $|T^1|$ of sequences in types $T^0$ and $T^1$ corresponding to sub-trees of the tree structure of type $T_X$. Number $|T^b|$ denotes the size of the type class defined by the sub-tree following branch b coming from the root of the parsing tree $T_X$ of sequence X (b=0, 1 in the binary case), and $c_b$ is the number of phrases (or non-root nodes) in $T^b$.

Figure 7:
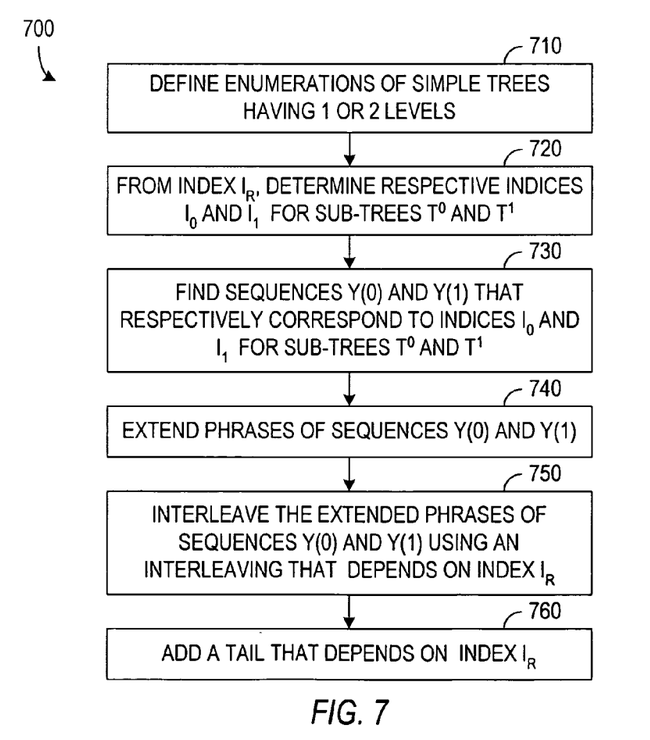
FIG. 7 is a flow diagram of a process for generating a randomly drawn sequence from the set of sequences of the same type as an input sequence.

Given an integer $I_R$ in the range from 0 to $|T_X|-1$, the enumeration provides a systematic ordering of the sequences of type $T_X$ and therefore identifies the sequence y" corresponding to integer $I_R$. The generation procedure 700 for a sequence y" corresponding to an integer value $I_R$ proceeds, recursively, as illustrated in FIG. 7. For simplicity, the following description of the enumeration process assumes that the alphabet is binary, and that the tree $T_X$ is complete, i.e., every node has either two children (corresponding to branches '0' and '1'), or none (i.e., the node is a leaf). The procedure can be extended to non-binary alphabets and non-complete trees in a straightforward manner.

Step 710 starts the recursion process 700 by providing an enumeration of the sequences corresponding to a simple complete binary tree having a root node and two level 1 nodes respectively corresponding to strings "0" and "1". This tree structure has two corresponding 2-bit sequences "01" and "10". One exemplary mapping for the two leaf tree returns the sequence '01' if $I_T$ is 0 or returns the sequence '10' if $I_T$ is 1. A tree that contains just the root node with no other nodes corresponds only to the empty string λ, and the mapping returns the empty string λ. If tree $T_X$ is neither of these simple trees, recursive process 700 proceeds to step 720 to generate a sequence y" corresponding to any integer $I_R$ using the enumeration of sub-trees.

Step 720 determines from the index value $I_R$ for tree $T_X$ respective indices $I_0$ and $I_1$ for sub-trees $T^0$ and $T^1$ of tree $T_X$. For simplicity of expressions, variables can be defined as follows: $l=I_T \bmod m(n-n_T)$; $I_T'=(I_T-l)/m(n-n_T)$; $I_C=I_T' \bmod M$; and $b=(I_T'-I_C)/M$, where M is the combinatorial coefficient $M(c_0,c_1)$ mentioned above. If $c_0 \geq c_1$ then index $I_0=b \bmod |T^0|$ and index $I_1=(b-I_0)/|T^0|$. Otherwise, if $c_0 \leq c_1$ then index $I_1=b \bmod |T^1|$, and index $I_0=(b-I_1)/|T^1|$.

Step 730 generates a sequence $y(0)$ that the enumeration for the sub-tree $T^0$ identifies as corresponding to index $I_0$ and generates a sequence $y(1)$ that the enumeration for the sub-tree $T^1$ identifies as corresponding to the index $I_1$. Step 730 is recursive and may include nested repetitions of steps 720, 730, 740, and 750, where the inner most nesting of step 730 uses the enumeration defined for a simple tree in step 710.

Parsing sequences $y(0)$ and $y(1)$ respectively provides phrases $p(0)_0 p(0)_1 \ldots p(0)_{c_0}$ and phrases $p(1)_0 p(1)_1 \ldots p(1)_{c_1}$, with phrases $p(0)_0$ and $p(1)_0$ being the null string $\lambda$. Step 740 obtains original phrases of sequence X by appending a '0' to the left of each phrase of $y(0)$ and '1' to the left of each phrase of $y(1)$.

Step 750 then interleaves the extended phrases to generate the sequence $y''$ corresponding to index $I_R$. Known enumeration techniques for combinations, which, given a number i in the range $0 \leq i \leq M$, with $M=M(c_0,c_1)$, can efficiently produce the i-th combination of $c_0+c_1+2$ objects taken $c_0+1$ at a time, according to a systematic ordering. Such a combination can be represented by a set of $c_0+1$ distinct integers in the range from 0 to $c_0+c_1+1$. See, for example, S. Even, "Algorithmic Combinatorics," Chapter 2. Using a systematic enumeration of combinations such as mentioned above, variable $I_C$, which is related to integer $I_R$ as indicated above, identifies a combination $\{i_0, i_1, i_2, \ldots, i_{c_0}\}$ of $c_0+1$ indices in the range from 0 to $c_0+c_1+1$. Interleaving the extended phrases of sequence $y(0)$ and the phrases of sequence $y(1)$ so that phrases from sequence $y(0)$ occupy positions $i_0, i_1, i_2, \ldots, i_{c_0}$ in the interleaved phrase sequence, and phrases from sequence $y(1)$ occupy the rest of the $c_0+c_1+2$ positions provides the substrings of sequence $y''$ but without a tail.

Step 760 adds a tail $t_y$. Tail $t_y$ of sequence $y''$ can be the phrase corresponding to the l-th node at level $n-n_T$ of tree $T_X$, counting from zero, for example, from left to right. Appending tail $t_y$ to the interleaved phrase sequence completes the generation of sequence $y''$.

The complexity of the one-to-one enumeration of sequences corresponding to type $T_X$ may not be necessary to provide a good simulation Y of a sequence X. For example, a set $S_X$ consisting of all sequences that result from a permutation of the C substrings in a given partition of a sequence X is a superset of the type $T_X$, and superset $S_X$ contains at most C! sequences since there are C! possible permutations of C substrings and more than one permutation may produce the same sequence. An alternative simulation process draws a random integer from the range from 1 to C!, and applies a permutation corresponding to the random integer to the phrases or substrings of sequence X to generate a simulation Y.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A computer program product for simulating an input sequence, the product being embodied on a computer-readable medium and comprising code that, when executed, causes a computer to perform the following:
   partitioning the input sequence into a partition including a set of substrings and a tail, wherein the substrings have lengths that are not all equal; and
   outputting the substrings in a random order to generate an output sequence simulating the input sequence.

2. The product of claim 1, wherein partitioning the input sequence comprises selecting each of the substrings to consist of one or more consecutive symbols from the input sequence, where each of the substrings differs from the other substrings of the partition.

3. The product of claim 2, wherein the tail is selected from the group consisting of an empty string and the substrings of the partition.

4. The product of claim 1, wherein for each substring, the substring is a shortest sub-sequence of consecutive symbols from the input sequence such that the substring differs from all of the substrings that are in the partition and preceding in the input sequence.

5. The product of claim 4, wherein the code, when executed, further causes the computer to perform the following:
   drawing a random integer from a range of $|T_X|$ integers, where $|T_X|$ is the number of sequences in a set $T_X$ such that for each sequence in the set $T_X$, a partition of the sequence into substrings such that each substring is a shortest sub-sequence of symbols from the sequence that differs from all of the substrings of the partition that are preceding in the sequence includes a set of substrings that is equal to the set of the substrings in the partition of the input sequence; and
   mapping the random integer to a corresponding one of the sequences in the set $T_X$, wherein the sequence corresponding to the random integer defines the random order for outputting the substrings.

6. The product of claim 1, wherein outputting the substrings comprises:
   organizing the substrings in a tree having multiple levels, wherein each of the levels contains substrings of equal length, and branches between any two of the levels connect each substring in a higher of the two levels to a substring that results from deleting a last symbol of the substring;
   designating the substrings in the partition as available;
   selecting one of the substrings as a current substring;
   randomly selecting one of the branches from the current substring to the substrings in a higher one of the levels of the tree, wherein each of the branches from the current substring has a probability of being taken that depends on how many available uses there are of the substrings that are connected through the branch to the current substring;
   changing the current substring to the substring at an end of the branch selected;
   in response to the current substring not being available, repeating selection of one of the branches from the current substring and changing the current substring to the substring at the end of the branch selected; otherwise outputting the current substring; and
   marking the current substring as used.

7. The product of claim 6, wherein selecting one of the substrings as the current substring comprises selecting an empty string as the current substring.

8. The product of claim 6, wherein marking the current substring as used changes the string from being available to being unavailable.

9. The product of claim 6, wherein marking the current substring as used reduces available uses of the current substring.

10. The product of claim 6, wherein the probability of each of the branches being taken is equal to a ratio of a total of the available uses of the substrings that are connected through the branch to the current substring and a total of available uses of the substrings that are connected through all of the branches connecting the current substring to higher levels in the tree.

11. The product of claim 1, wherein the code, when executed, further causes the computer to perform the following:

generating the input sequence from an ordering of pixel values in a digital representation of a texture; and generating a digital representation of a simulation of the texture from the output sequence.

12. The product of claim 1, wherein the code, when executed, further causes the computer to perform the following:

generating the input sequence from measurements of a first system; and using the output sequence for testing of a second system.

13. A computer program product for generating a simulated sequence, the product being embodied on a computer-readable medium and comprising code that, when executed, causes a computer to perform the following:

(a) creating a tree structure having nodes that correspond to substrings resulting from parsing an input sequence, wherein all of the nodes except a root node are initially designated as being unused;

(b) setting a current node equal to the root node;

(c) in response to the current node being unused, outputting a substring corresponding to the current node as part of the simulated sequence, designating the current node as being used, and setting the current node equal to the root node;

(d) in response to current node being used, selecting a branch from the current node to one of the nodes in a higher level of the tree structure and setting the current node to the node at an upper end of the selected branch; and (e) repeating (c) and (d) until all of the nodes are used.

14. The product of claim 13, wherein the substrings resulting from parsing the input sequence comprises the substrings from parsing the input sequence according to the Lempel-Ziv incremental parsing rule.

15. The product of claim 13, wherein the input sequence comprises a binary sequence, and selecting the branch from the current node comprises:

selecting a first branch from the current node if a second branch from the current node is blocked; and selecting the second branch from the current node if the first branch from the current node is blocked.

16. The product of claim 13, wherein the input sequence comprises a binary sequence, and selecting the branch from the current node comprises selecting a branch $Vb$, wherein branch index b is a randomly drawn bit with a probability of being 1 equal to $U(V1)/[U(V0)+U(V1)]$, $U(V1)$ is a number of unused nodes on a branch $V1$ from the current node, and $U(V0)$ is a number of unused nodes on a branch $V0$ from the current node.

* * * * *